July 9, 1940.  H. C. WINKEL  2,207,650
MECHANISM FOR SEVERING GRIDS
Filed March 30, 1939  3 Sheets-Sheet 1

Inventor:
Herbert C. Winkel,
By:
Chritton, Wiles, Davis, Hirsch & Dawson
Attorneys July 9, 1940.    H. C. WINKEL    2,207,650
MECHANISM FOR SEVERING GRIDS
Filed March 30, 1939    3 Sheets-Sheet 3

Inventor:
Herbert C. Winkel,
By:
Chritton, Wiles, Davies, Hirschl & Dawson
Attorneys.

Patented July 9, 1940

2,207,650

UNITED STATES PATENT OFFICE 2,207,650

MECHANISM FOR SEVERING GRIDS

Herbert C. Winkel, Chicago, Ill., assignor of one-half to Alvy C. Yerkey

Application March 30, 1939, Serial No. 265,061

7 Claims. (Cl. 164—61)

This invention relates to mechanism for severing grids or the like.

An object of the invention is to provide simple and effective means for feeding joined grids automatically forward to mechanism for entirely removing the connecting portions between the grids so as to provide two entirely separated grids. A further object is to provide mechanism of simple and effective construction whereby connected grids are fed forwardly and the irregular connecting portions between them entirely removed, and the separated grids stacked and carried away. Other specific objects and advantages will appear as the specification proceeds.

The invention is illustrated, in a preferred embodiment, by the accompanying drawings, in which—

Figure 1:
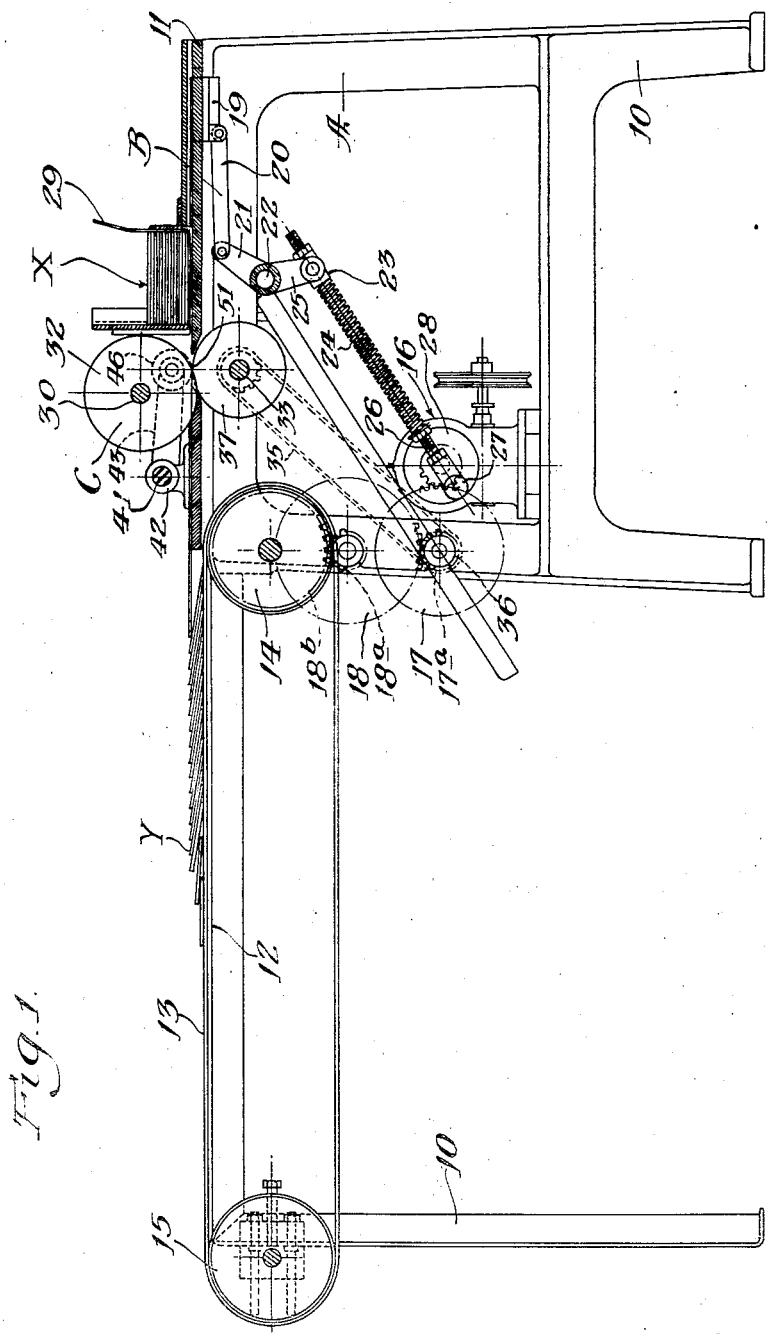
Figure 2:
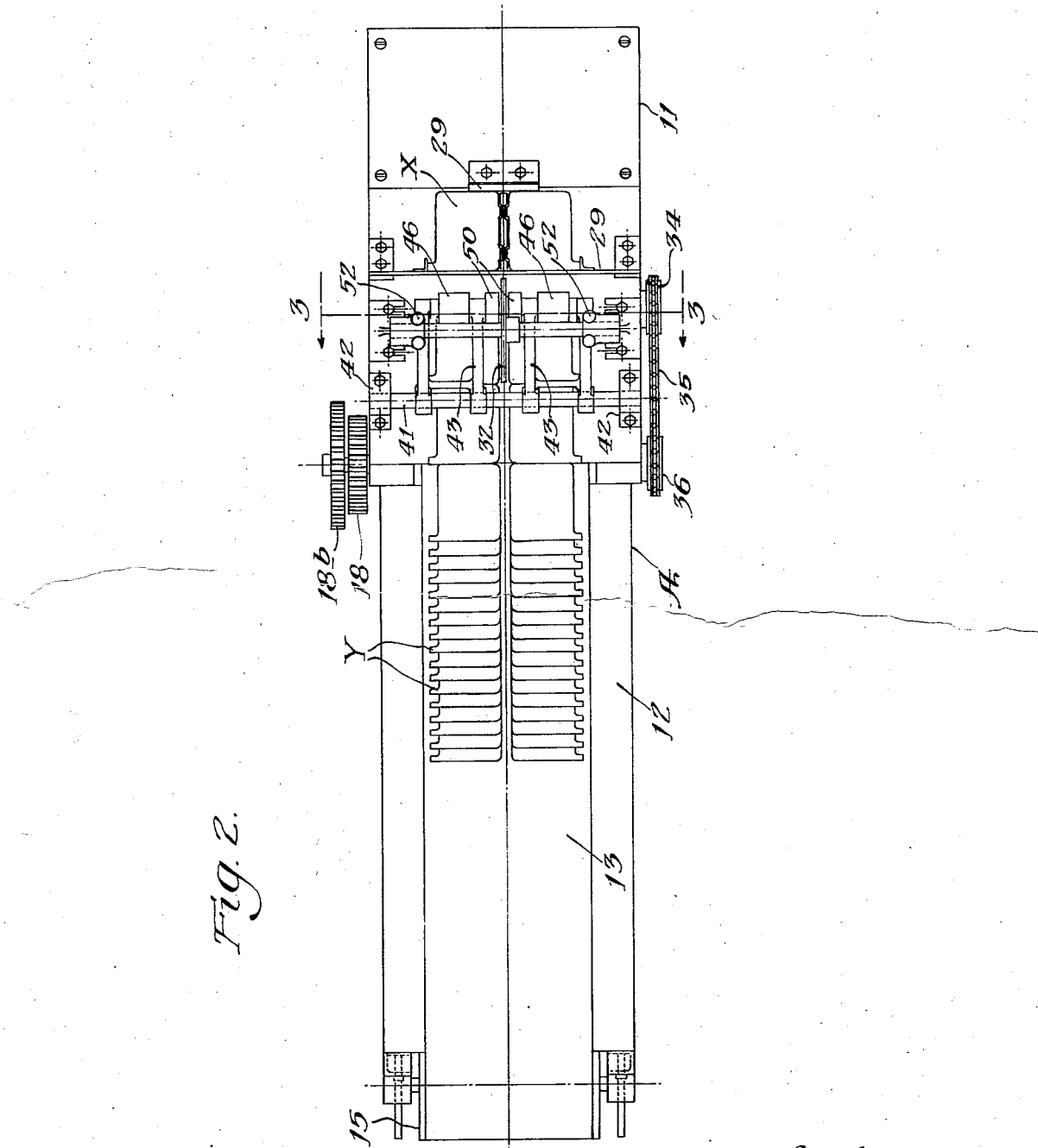

Figure 1 is a side view in elevation of apparatus embodying my invention; Fig. 2, a top plan view; and Fig. 3, a vertical sectional view, the section being taken as indicated at line 3 of Fig. 2.

In the illustration given, A designates a frame; B, mechanism for feeding grids forwardly; and C, severing mechanism.

The frame A may be of any suitable construction. In the illustration given, it comprises pedestal members 10 upon which is mounted a table portion 11 and a belt supporting portion 12. A conveyor belt 13 is mounted on wheels 14 and 15, and wheel 14 is driven by motor 16, through intermediate gears 16a, 17, 17a, 18, 18a, and 18b. The grid feeding mechanism comprises a feed arm 19 pivotally connected to strap 20, as shown more clearly in Fig. 1. The strap 20 is connected to bell crank 21 which is pivoted to frame 22. The lower end of crank 21 is connected to sleeve 23 urged by spring 24 against nut 25, the spring being carried by rod 26. The lower end of rod 26 is pivotally connected at 27 to the driving disk 28 carried by the shaft of the motor. The rotation of the shaft reciprocates crank arm 21 and draws the feed arm 19 forwardly and rearwardly, thus feeding grids from the hopper 29 forwardly one at a time.

The grid severing mechanism includes a shaft 30 mounted upon raised brackets 31 and centrally disposed thereon is the cutting disk 32. A driving shaft 33 is supported in the lower portion of the frame, as shown more clearly in Fig. 3, and is provided at one end with a sprocket 34 which is connected by chain 35 to the sprocket 36, as shown more clearly in Fig. 1. Fixed upon shaft 33 are the two drums 37 which are centrally spaced apart to permit the disk 32 to extend therebetween. The drums are provided with resilient surfaces 38 of rubber or other suitable material. Also, the drums are provided with spring pressed plungers 39 adapted to engage openings 40 in the shaft 33 so as to lock the drums to the shaft. It will be understood that the shaft is provided with a plurality of spaced openings by which the drums can be shifted to permit the accommodation thereof for grids of different types and sizes.

Upon the top of the frame, I provide means for holding the grids tightly upon the top of drums 37. Such holding means comprise a shaft 41 supported in brackets 42, as shown more clearly in Fig. 2. Pivotally mounted upon the shaft 41 are arm supports 43 which extend forwardly and provide bearings 44 for the two shafts 45, the shafts 45 being spaced apart centrally to permit disk 32 to extend therebetween. Mounted upon each of the shafts 45 is a roller 46 provided with a resilient outer surface 47 formed of rubber or other suitable material. On the inner ends of each shaft is mounted a second roller 48 also provided with a rubber or resilient sleeve 49 except that at the extreme inner end the metal roller 48 provides a flange 50.

In the illustration given, the joined grids within hopper 29 are indicated by the letter "X," the separated grids after passing through the apparatus being indicated by the letter "Y."

Figure 3:
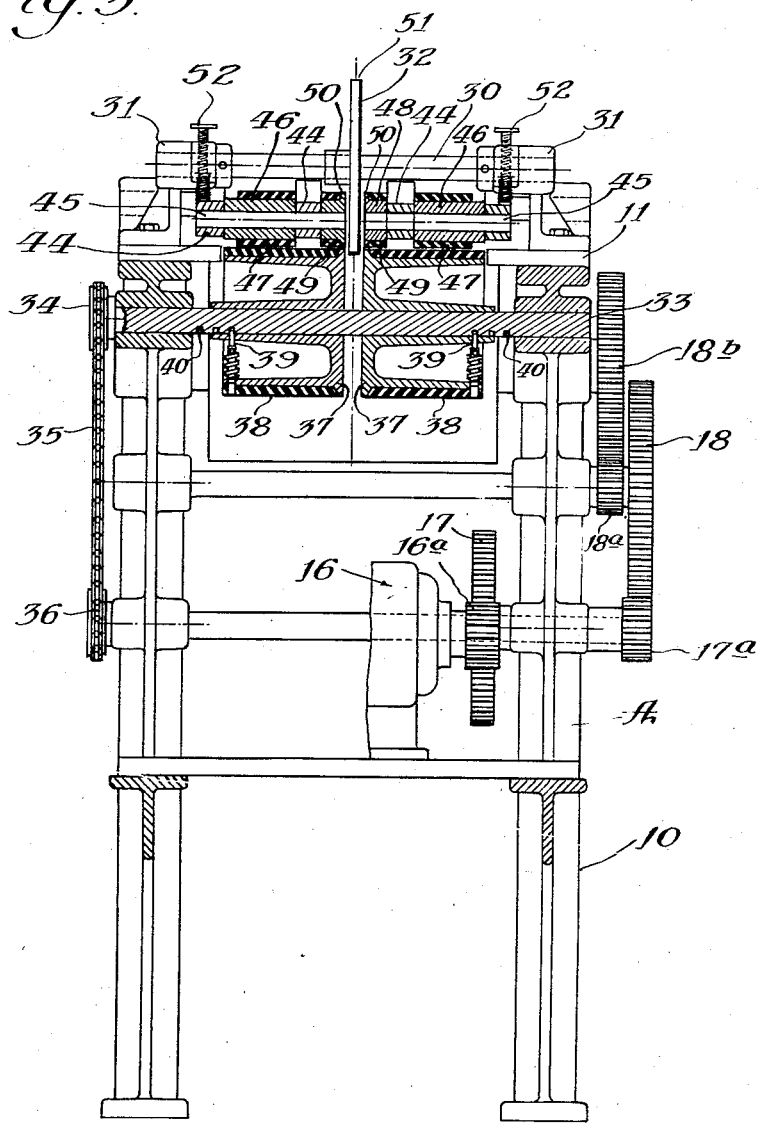

If desired, pin guide springs 52 may be employed, as shown more clearly in Fig. 3, for urging the shafts 45 downwardly.

Operation

In the operation of the device, the grids X to be separated are placed within the hopper 29 and the motor started in operation. As disk 27 rotates, the crank arm 21 is reciprocated and the feed arm 19 feeds a joined pair of grids X forwardly so that the same comes between the cutter disk 32 and the drums 37. The rollers 46 and 48 on each of the shafts 45 engage the grids on opposite sides of their connecting portion and hold them against drums 37. Drums 37 meanwhile are driven by the sprocket chain 35 and cause the central connecting portion of the combined grid structure X to be cut away. The severed grids are then passed upon the belt conveyor 13 and carried away in stacked relation, as shown more clearly in Fig. 1.

The combined grid structure X consists of two separate grids connected by an intermediate portion which is flared in its central and end areas but constricted at two intermediate points, as shown more clearly in Fig. 2. It will be observed that the disk 32 passes through the constricted portions of the grid while at the same time serving to strip the center connecting portions on opposite sides of the constricted portions. At the same time, the metal roller portions of the drums 37 and rollers 48 lying adjacent the inner ends thereof firmly hold the grids while the central connecting portion therebetween is cut away.

In the severing of grids, it has been heretofore proposed to use superposed cutting members, one member passing into the groove of the other. This structure has been found to be unsatisfactory because the cutting portion of the uper disk meets the grid portion which is to be cut away at a point in advance of the supporting drums therebelow so that considerable strain is placed upon the grid structure and there is a tendency for the grid to be bent. I have found that this objection is overcome and that effective severing is accomplished without straining the grids by locating the upper disk 32 at a point to the rear of the lower supporting drums 37 so that the cutting edge portion, as indicated by the numeral 51, is directly over the shaft 33 which supports the lower drums 37. Thus the best point of support is directly below the point 51 where the cutting edge of the disk 32 meets the oncoming grid structure. With this mechanism, the grids are held by top rollers 46 in firm position directly above the axis of the drums where they first meet the cutting edge of the disk 32.

The apparatus is extremely efficient and operates to sever grids rapidly without distorting or straining them, the severed grids being passed automatically upon a belt upon which they are stacked and removed.

While in the foregoing specification, I have set forth a specific structure by way of illustration, it will be understood that great changes in details of construction may be made without departing from the spirit of my invention.

I wish it to be understood that I do not desire to be limited to the exact details of construction shown and described, for obvious modifications will occur to a person skilled in the art.

I claim:

1. In apparatus of the character set forth, a frame, a pair of spaced rollers rotatably supported below said frame, means for driving said rollers, a cutting disk supported above said frame and extending between said rollers, yieldable means on both sides of said disk for urging grids upon said rollers, and means for feeding joined grids toward said disk to sever said grids.

2. In apparatus of the character set forth, a frame, a pair of spaced rollers rotatably supported below said frame, means for driving said rollers, a cutting disk supported above said frame and extending between said rollers, yieldable means on both sides of said disk for urging grids upon said rollers, and means for feeding joined grids toward said disk to sever said grids, said rollers being provided with a resilient surface and at their inner edge with a rigid surface.

3. In apparatus of the character set forth, a frame, a pair of spaced rollers rotatably supported below said frame, means for driving said rollers, a cutting disk supported above said frame and extending between said rollers, yieldable means on both sides of said disk for urging grids upon said rollers, and means for feeding joined grids toward said disk to sever said grids, said yieldable means being provided with a resilient surface and at its inner end with a metal surface.

4. A machine of the character set forth comprising: a frame, a grid hopper, means for feeding joined grids alternately in a forward direction, means for severing said grids, and conveyor means for carrying away said severed grids, said severing means comprising a pair of drums and a cutting disk supported therebetween, the axis of said cutting disk being out of vertical alignment with the axes of said rollers.

5. A machine of the character set forth comprising: a frame, a grid hopper, means for feeding joined grids alternately in a forward direction, means for severing said grids, conveyor means for carrying away said severed grids, said severing means comprising a pair of drums and a cutting disk supported therebetween, the axis of said cutting disk being out of vertical alignment with the axes of said rollers, and yieldable means opposite said rollers for yieldably urging grids against said rollers.

6. In apparatus of the character set forth, a frame, a pair of spaced drums supported in alignment with the top of said frame, a cutting disk mounted for rotation above and between said rollers, pivotally mounted means for swingably supporting the shafts above said rollers, friction means carried by said shafts above said rollers, and means for feeding joined grids between said rollers and disk.

7. In apparatus of the character set forth, a frame, means for feeding joined grids therealong, a pair of rollers supported below said frame and having their top surfaces extending through an opening in said frame, a cutting disk rotatably mounted above said frame whereby a vertical line drawn through the axes of said rollers passes through the forward portion of said disk, and means for feeding joined grids so that the central portion thereof is aligned with said disk.

HERBERT C. WINKEL.